United States Patent [19]
Takashima

[11] Patent Number: 5,925,605
[45] Date of Patent: Jul. 20, 1999

[54] CLEANING COMPOSITION FOR MOLD FOR MOLDING SEMICONDUCTOR DEVICE AND METHOD OF CLEANING MOLD USING THE SAME

[75] Inventor: Kouichi Takashima, Osaka, Japan

[73] Assignee: Nitto Denko Corporation, Osaka, Japan

[21] Appl. No.: 08/887,427

[22] Filed: Jul. 2, 1997

[30] Foreign Application Priority Data

Dec. 10, 1996 [JP] Japan ................................. 8-329633
Feb. 18, 1997 [JP] Japan ................................. 9-033725

[51] Int. Cl.$^6$ ........................... C11D 17/04; C11D 3/37; C11D 17/00
[52] U.S. Cl. .................. 510/188; 510/438; 510/445; 510/455; 510/500
[58] Field of Search ................. 510/188, 475, 510/405, 438, 445, 455, 500, 506, 372; 134/22.1, 22.19, 4, 2, 18, 42, 8

[56] References Cited

U.S. PATENT DOCUMENTS

| | | | |
|---|---|---|---|
| 1,929,560 | 10/1933 | Morton | 524/106 |
| 3,476,599 | 11/1969 | Grover et al. | 134/8 |
| 4,670,329 | 6/1987 | Pas | 264/39 |
| 4,935,175 | 6/1990 | Kitaura et al. | 264/39 |
| 4,956,132 | 9/1990 | Kitaura et al. | 264/39 |
| 5,468,422 | 11/1995 | Khouzam et al. | 134/38 |
| 5,556,572 | 9/1996 | Nishinaka et al. | 510/188 |

FOREIGN PATENT DOCUMENTS

| | | | |
|---|---|---|---|
| 0 271 107 A2 | 6/1988 | European Pat. Off. | B29C 33/72 |
| 0 342 163 A1 | 11/1989 | European Pat. Off. | B29C 33/72 |
| 0 546 516 A2 | 6/1993 | European Pat. Off. | B29C 33/72 |
| 0 687 539 | 12/1995 | European Pat. Off. | |
| 27 32 064 A1 | 5/1979 | Germany | B08B 17/04 |
| WO 87/03531 | 6/1987 | WIPO | B29C 33/72 |

OTHER PUBLICATIONS

EP Search Report, dated Sep. 18, 1997, for EP 97110511.9.

*Primary Examiner*—Ardith Hertzog
*Attorney, Agent, or Firm*—Sughrue, Mion, Zinn Macpeak & Seas, PLLC

[57] ABSTRACT

A cleaning composition for a mold for molding a semiconductor device comprising an unvulcanized rubber, a cleaning agent, and water in an amount of from 1 to 30% by weight based on the total amount of the cleaning composition.

The cleaning composition is preferably used as a sheet form comprising the cleaning composition itself, wherein a plurality of straight cuts are formed on the surface of the sheet in a definite direction in parallel at an definite interval for enabling folding of the sheet and at least one cutting cut may be formed on the surface such that the cutting cut crosses perpendicularly to the plural cuts.

The cleaning sheet is very effective to remove soiled material on the inside surfaces of a mold formed by repeatedly molding semiconductor devices using a thermosetting resin composition.

1 Claim, 5 Drawing Sheets

CLEANING COMPOSITION FOR MOLD FOR MOLDING SEMICONDUCTOR DEVICE AND METHOD OF CLEANING MOLD USING THE SAME

FIELD OF THE INVENTION

The present invention relates to a cleaning composition for a mold for molding a semiconductor device, which is used for cleaning and regenerating a mold for molding semiconductor devices, the mold being soiled by repeating a molding work using a thermosetting resin composition for molding semiconductor devices. The present invention also relates to a method of cleaning a mold for molding semiconductor devices using the cleaning composition.

BACKGROUND OF THE INVENTION

In molding using a mold for molding a thermosetting resin molding material, a mold releasing agent contained in the thermosetting resin molding material oozes out to the inside surface of the mold to exhibit a mold-releasing action. However, when such a molding step is repeated, inconveniences occur that the releasing property of the molded products is decreased and the appearances of the molded product is poor. Those inconveniences are considered to be caused by that the releasing agent contained in the molding material oozes onto the inside surface of the mold and gradually deteriorates while successively accumulating on the surface of the mold by repeating the molding step, whereby the soiled material layer which lost the effect as the mold releasing agent is formed.

To solve such a problem, a cleaning work of the mold is performed at the stage of the formation of the soiled material layer which is the deteriorated mold releasing agent layer. For example, it is hitherto carried out that a thermosetting melamine resin molding material is placed in the mold, molded, and cured to integrate the soiled material on the inside surface of the mold with the molded product in a body, and the molded material integrated with the soiled material in a body is taken out of the mold, thereby the inside surface of the mold is cleaned. However, in such a cleaning method, formalin is by-produced as a condensation product of the thermosetting melamine resin molding material to generate unpleasant odor, and also, the removal of the molded product is not easy and takes much time. Therefore, the working environment greatly deteriorates, resulting in decreasing the cleaning workability.

Thus, recently a method is proposed and is partially practically used, wherein an unvulcanized rubber compound is used in place of the above-described thermosetting melamine resin molding material, the unvulcanized rubber compound is vulcanized in the mold to form a vulcanized rubber, the soiled material on the inside surfaces of the mold is integrated with the vulcanized rubber in a body in forming the vulcanized rubber, and by taking out the vulcanized rubber from the mold, the inside surface of the mold is cleaned.

However, the composition of the thermosetting resin molding material differs according to the required characteristics, there are many kinds of thermosetting resin molding materials, and the state of soiling the mold caused by repeating molding and the components of the soiled material are widely various. In particular, where a soiled material is formed on the inside surfaces of a mold in repeatedly conducting molding using a molding material comprising a biphenyl epoxy resin, a polyfunctional epoxy resin, or a dicyclopentadiene epoxy resin as the main component in place of a novolak epoxy resin conventionally used, there is a problem that the soiled material is baked severely to the inside surfaces of a mold, and it is impossible to completely remove the soiled material in the conventional cleaning method using the unvulcanized rubber compound.

SUMMARY OF THE INVENTION

The present invention has been made under such circumstances.

One object of the present invention is to provide a cleaning composition for a mold for molding a semiconductor device, the composition having an excellent cleaning effect to a mold for molding a semiconductor device, which is repeatedly used for molding using a thermosetting resin composition.

Another object of the present invention is to provide a cleaning method for effectively cleaning a mold for molding a semiconductor device using the cleaning composition.

As a result of various investigations to achieve the above-described objects, it has now been found that the above objects are achieved by the present invention as described hereinbelow.

According to a first embodiment of the present invention, there is provided a cleaning composition for a mold for molding a semiconductor device repeatedly using a thermosetting resin composition, the cleaning composition comprising;

(a) an unvulcanized rubber, and (b) a cleaning agent wherein a water content of the cleaning composition is from 1 to 30% by weight based on the weight of the cleaning composition.

According to a second embodiment of the present invention, there is provided a cleaning method for a mold for molding a semiconductor device, which comprises the steps of:

preparing a cleaning sheet comprising the cleaning composition for a mold for molding a semiconductor device, having formed on one surface thereof a plurality of straight cuts in parallel in a definite direction at a definite interval, bending the sheet along the cut with the surfaces having the cuts being outside, to contact the back surfaces each other and to heap up in plural stages, placing the sheet in the heaped up state on the inside surface of an open mold, and cleaning the inside surfaces of the mold by closing the mold to hold the sheet in the heaped up state between the mold and pressing the sheet under heating.

According to a third embodiment of the present invention, there is provided a cleaning method for a mold for molding a semiconductor device, which comprises the steps of:

prepare a cleaning sheet comprising the cleaning composition for a mold for molding a semiconductor device, having formed on the surface thereof a plurality of straight cuts (A) in parallel in a definite direction at a definite interval and also having formed on the surface thereof at least one straight cutting cut (B) such that the cutting cut (B) crosses perpendicularly a plurality of the straight cuts (A), cutting the sheet along the cutting cut (B), bending each sheet thus cut along the cut (A) with the surface having the cuts (A) being outside, to contact the back surfaces each other and to heap up in plural stages, placing each sheet in the heaped up state in the inside surface of an open mold, and cleaning the inside surfaces of the mold by closing the mold to hold each sheet in the heaped up state between the mold and pressing each sheet under heating.

The present inventors made a series of investigations about cleaning materials for effectively removing soiled material on the inside surfaces of a mold formed by repeating molding using a molding material comprising a biphenyl epoxy resin, a polyfunctional epoxy resin, or a dicyclopentadiene epoxy resin as the main component, which is recently widely used as epoxy resins. That is, the inventors previously proposed a mold cleaning composition containing cleaning components together with an unvulcanized rubber and filed a patent application. However, even by using this cleaning composition, cleaning a mold which was repeatedly used for molding semiconductor devices using the molding material is insufficient. The inventors made various investigations aiming components, etc., which constitute cleaning compositions. That is, hitherto, it is generally considered that when a mold cleaning composition using an unvulcanized rubber containing a cleaning component contains water, the water is vaporized at the vulcanization of the unvulcanized rubber by heating and the vaporized vapor gives bad influences on the mold for molding semiconductor devices. However, as a result of the above-described investigations, the inventors have found that when water is dared to exist in a mold cleaning composition at a specific ratio of the water content and the inside surface of a molding mold is cleaned using the mold cleaning composition, a soiled material accumulated on the inside surface of the mold formed by repeatedly molding using an epoxy resin composition comprising the above-described epoxy resin as the main component, the soiled material having been difficult to sufficiently clean by conventional cleaning compositions, is integrated with the molded product comprising the mold cleaning composition in a body, the soiled material is effectively removed from the mold, and the surface of the mold is effectively cleaned. The present invention has been attained based on this finding.

Also, in a sheet comprising the cleaning composition for a mold for molding a semiconductor device, having formed on one surface thereof a plurality of straight cuts in parallel in a definite direction, the sheet can be easily heaped up by folding the sheet along the cut when using the same. In this case, since the block pieces of the sheet partitioned by the parallel cut are connected to each other at the bottom portions of the cuts, the sheet is regularly heaped up by folding without being slipped out and also the block pieces are not heaped up in a crossed state. Thus, the heaped up article obtained does not become a distorted form. By cleaning the inside surface of the mold with the sheet-form cleaning composition thus regularly heaped up, for example, poor cleaning which occurs by the insufficient press-contact of the unvulcanized rubber with the surfaces of the mold does not occur. Also, complicated works of cutting the sheet in the same size by expressly measuring the size of the sheet and heaping up the cut sheets by properly arranging become unnecessary, whereby the cleaning work is simplified.

When the cuts are formed on the surface of the sheet comprising the mold cleaning composition at a definite interval, the cuts function as a measure and thus in cleaning molds each having a different size and type, the sheet of an appropriate size is easily cut off and heaped up to perform cleaning.

Furthermore, in the sheet comprising the cleaning composition for a mold for molding a semiconductor device, having formed on one surface thereof a plurality of straight cuts (A) in parallel in a definite direction and also having formed thereon at least one straight cutting cut (B) such that the cutting cut (B) crosses perpendicularly to the straight cut (A), at the use thereof the sheet is appropriately cut along the cutting cut (B), and by using each sheet thus cut by folding along the cut (A), the sheet can be easily heaped up such that the heaped up sheet has an appropriate form and size for the size of a molding mold to be cleaned. In this case, because the block pieces partitioned by the cut (A) are connected at the bottom portion of the cut (A), the sheet is regularly heaped up by folding without being slipped out and also the block pieces are not heaped up in a crossed state. Thus, the heaped up article obtained does not become a distorted form. By cleaning the inside surface of the mold with the sheet-form cleaning composition thus regularly heaped up, for example, poor cleaning occurring by the insufficient press-contact of the unvulcanized rubber with the surface of the mold does not occur. Also, by forming the cutting cut (B), the sheet can be easily cut fitting to the size of a smaller mold without becoming an irregular form.

DETAILED DESCRIPTION OF THE INVENTION

The present invention is described in detail about the embodiments of the present invention below.

Figure 1:
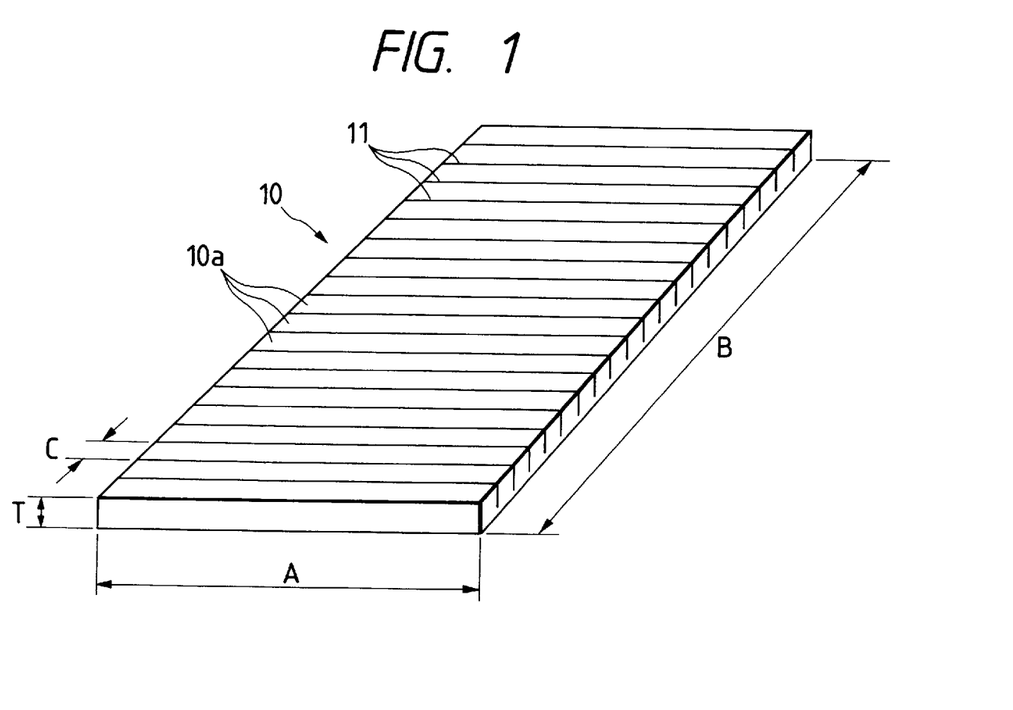
FIG. 1 is a slant view showing a sheet-form cleaning composition for a mold for molding a semiconductor device, which is an embodiment of the present invention.

The term "cut (or cuts)" used herein means that the cut is made vertically downwards, but a sheet is not completely cut up to the bottom, as shown in FIG. 1.

The cleaning composition for a mold for molding a semiconductor device (hereinafter referred to as "mold cleaning composition") of the present invention is obtained using an unvulcanized rubber (component A) which becomes a base and a cleaning agent (component B). Usually a vulcanizing agent is used together with these components. There is no particular limitation on the rubber material which becomes the unvulcanized rubber (component a). However, from the point of the working environment, an ethylene-propylene rubber (hereinafter referred to as "EPR") alone or a mixture of EPR and a butadiene rubber (hereinafter referred to as "BR") is preferably used.

The mixing ratio (x/y) of EPR (x) to BR (y) in the mixture of EPR and BR is preferably in the range of from 100/0 to 20/80. In the case of using EPR and BR together, the mixing ratio (x/y) is particularly preferably in the range of from 70/30 to 30/70. That is, in the mixing ratio of them, if EPR is less than 20 (BR is over 80), when removing a rubber molded product, which is performed at molding working, the inconveniences such as breaking of the molded product, etc., occur due to decrease of the strength of the molded product, and there is a tendency of making difficult the removing work of the molded product from the mold. In addition, above-described EPR includes an ethylene-propylene-diene rubber (EPDM).

The cleaning agent contained in the unvulcanized rubber which become the base includes, for example, imidazoles and imidazolines. They may be used alone or as a mixture thereof.

As the imidazoles, imidazoles represented by following formula (2) are used with preferred results;

(2)

wherein R represents a hydrogen atom, a straight chain hydrocarbon group having a substituent and having less than 11 carbon atoms or a straight chain hydrocarbon group having no substituent and having less than 11 carbon atoms, and the Rs may be the same or different.

Examples of the imidazoles include 2-methylimidazole, 2-ethyl-4-methylimidazole, 2-phenylimidazole, 1-benzyl-2-methylimidazole, and 2,4-diamino-6[2'-methylimidazolyl-(1)']-ethyl-s-triazine. They can be used alone or as a mixture thereof.

Also, as the imidazolines, imidazolines represented by following formula (3) are used with good results;

(3)

wherein R represents a hydrogen atom, a straight chain hydrocarbon group having a substituent and having less than 11 carbon atoms, or a straight chain hydrocarbon group having no substituent and having less than 11 carbon atoms, and the Rs may be the same or different.

Examples of the imidazolines include 2-methylimidazoline, 2-methyl-4-ethylimidazoline, 2-phenylimiazoline, 1-benzyl-2-methylimidazoline, 2-phenyl-4-methyl-5-hydroxy-methylimidazoline, 2,4-diamino-6[2'-methylimidazolyl-(1)']-ethyl-s-triazine, 2,4-diamino-6[2'-methyl-4'-ethylimidazolyl-(1)']ethyl-s-triazine, 1-cyanoethyl-2-methylimidazoline, and 1-cyanoethyl-2-methyl-4-ethylimidazoline. They can be used alone or as a mixture thereof.

The imidazole or the imidazoline may be used as is or may be used as a mixture with an organic solvent such as alcohols (e.g., methanol, ethanol, and n-propanol), toluene, xylene, etc. Where the imidazole or the imidazoline is used together with the organic solvent, the amount of the organic solvent is preferably 50 parts by weight (hereinafter referred to as "parts") or lower, and more preferably 20 parts or lower, per 100 parts of at least one of the imidazole and the imidazoline.

The compounding amount of the cleaning agent (component B) such as at least one of the imidazoles and the imidazolines described above is preferably from 5 to 20 parts, and more preferably from 8 to 16 parts, per 100 parts of the unvulcanized rubber (component A). That is, if the content of the cleaning agent (component B) is less than 5 parts, it is difficult to give a sufficient cleaning power to the mold, while if the content is more than 20 parts, in the case of cleaning the mold using the mold cleaning composition obtained, there is a tendency that the cleaning composition attaches to the mold to reduce the releasing workability from the mold.

The mold cleaning composition of the present invention is usually compounded with a vulcanizing agent together with the unvulcanized rubber (component A) which becomes the base and the cleaning agent (component B).

There is no particular limitation on the vulcanizing agent, and conventional materials are used. Examples of the vulcanizing agent include organic peroxides such as n-butyl-4,4-bis(t-butylperoxy) valerate and 1,1-di(t-butylperoxy)-3,3,5-trimethylcyclohexane. They can be used alone or as a mixture thereof. The compounding amount of the vulcanizing agent is in the range of preferably from 1 to 3 parts per 100 parts of the unvulcanized rubber (component A).

In addition to the component A and the component B, glycol ethers may be compounded.

The glycol ethers which can be used are compounds represented by following formula (4);

(4)

wherein n represents a positive integer, and $R_1$ and $R_2$ each represent a hydrogen atom or an alkyl group; when one of $R_1$ and $R_2$ is a hydrogen atom, the other is an alkyl group and when both are alkyl groups, they may be the same or different.

Examples of the glycol ethers represented by the above formula include ethylene glycol dimethyl ether, diethylene glycol dimethyl ether, triethylene glycol dimethyl ether, tetraethylene glycol dimethyl ether, polyethylene glycol dimethyl ether, diethylene glycol monomethyl ether, diethylene glycol monoethyl ether, diethylene glycol monopropyl ether, diethylene glycol monobutyl ether, diethylene glycol diethyl ether, diethylene glycol propyl ether, diethylene glycol dibutyl ether, ethylene glycol monomethyl ether, ethylene glycol monoethyl ether, ethylene glycol monopropyl ether, and ethylene glycol monobutyl ether.

In the glycol ethers represented by the formula (4), it is preferred that n is 1 or 2; when one of $R_1$ and $R_2$ is a hydrogen atom, the other is an alkyl group having from 1 to 4 carbon atoms, and when $R_1$ and $R_2$ are alkyl groups, they are alkyl groups each having from 1 to 4 carbon atoms. In addition, when n in the formula (4) is 3 or larger, the compatibility of the glycol ether with a rubber is decreased and when the carbon atom number of the alkyl group is 5 or larger, there is a tendency that the permeability of the mold releasing agent to the oxidized and deteriorated layer, etc., is reduced.

Furthermore, the boiling point of the glycol ether is preferably from about 130 to 250° C. That is, molding using a mold is usually carried out at a temperature of from 150 to 185° C. Thus, when the boiling point of the glycol ether is lower than 130° C., the vaporization of the glycol ether at the use thereof for cleaning is remarkable, whereby there is a possibility of reducing the cleaning work environment, while when the boiling point is higher than 250° C., the evaporation of the glycol ether becomes difficult and remains in the vulcanized rubber material. Thus, the strength of the vulcanized rubber after cleaning in taking out the vulcanized rubber from the mold becomes weak to get out of shape, whereby it becomes difficult to sufficiently release the oxidized and deteriorated layer, etc., of the mold releasing agent from the surface of the mold and there is a tenency of decreasing the cleaning workability.

The glycol ether may be used as is or may be used as a mixture with an organic solvent such as alcohols (e.g., methanol, ethanol, and n-propanol), toluene, xylene, etc. Where the mixture is used with the organic solvent, the amount of the organic solvent used is usually 50 parts or lower, and preferably 20 parts or lower, per 100 parts of the glycol ether.

The compounding amount of the glycol ether is usually from 10 to 60 parts, and preferably from about 15 to 25 parts, per 100 parts of the unvulcanized rubber (component A).

If necessary, the mold cleaning composition of the present invention can appropriately contain a mold releasing agent, a reinforcing agent, etc., in addition to the above-described components A and B, the vulcanizing agent, and the above-described components.

There is no particular limitation on the mold releasing agent and conventional mold releasing agents can be used.

Examples of the mold releasing agent include long-chain fatty acids such as stearic acid, behenic acid, etc.; metal salts of long-chain fatty acids, such as zinc stearate, calcium stearate, etc.; ester waxes such as carnauba wax, montan wax, the partially vulcanized ester of montanic acid, etc.; long-chain fatty acid amides such as stearylethylenediamide, etc.; and paraffins such as polyethylene wax, etc. In the mold releasing agents, it is preferred to use the mold releasing agent having a melting point of 200° C. or higher or having a boiling point of 200° C. or higher. It is more preferred to use the mold releasing agent having a melting point of from 50 to 150° C. That is, molding using a mold is usually carried out at a temperature of from 150 to 200° C. as described above. Thus, when the melting point of the mold releasing agent is higher than 200° C., the releasing agent does not ooze onto the inside surface of the mold, while when the boiling point thereof is lower than 200° C., the releasing agent oozed onto the surface of the mold is evaporated and there is a tendency of not give the function thereof.

The content of the mold releasing agent is preferably in the range of from 5 to 20 parts, and more preferably from 8 to 16 parts, per 100 parts of the unvulcanized rubber (component A). That is, if the content of the mold releasing agent is less than 5 parts, it is difficult to obtain a sufficient releasing effect, while if the content thereof is more than 20 parts, the cleaning power is decreased and also there is a possibility that in the case of producing molded products using the mold after regeneration, the appearance of the molded products is poor.

Examples of the reinforcing agent include inorganic fillers such as silica, alumina, calcium carbonate, aluminum hydroxide, titanium oxide, etc. The compounding amount of the reinforcing agent is preferably from 10 to 50 parts per 100 parts of the unvulcanized rubber (component A).

The mold cleaning composition of the present invention is obtained as follows. The mold cleaning composition is obtained by compounding the unvulcanized rubber (component A) which becomes the base, the cleaning agent (component B), the vulcanizing agent, water giving a definite water content, and other additives, and kneading the compounded mixture by a kneader. The mold cleaning composition thus obtained is used by forming the mold cleaning composition into a sheet form using, for example, rolling rolls, etc., from the points of the workability, the ease of handling, etc. In the case of using as a sheet form, the thickness of the sheet is usually from 3 to 10 mm.

It is necessary that the mold cleaning composition thus obtained contains water such that the water content is in the range of from 1 to 30% by weight based on the weight of the total cleaning composition. In this case, from the point of obtaining the better mold cleaning effect, the water content is preferably from 3 to 25% by weight.

The most important feature of the mold cleaning composition of the present invention is that the unvulcanized rubber (component A) which becomes the base and the cleaning agent (component B) are used and a specific amount of water is incorporated in the cleaning composition, whereby a mold for molding a semiconductor device using an epoxy resin composition comprising, for example, a biphenyl epoxy resin, a polyfunctional epoxy resin, or a dicyclopentadiene epoxy resin, although complete cleaning of the mold was impossible with conventional cleaner compositions, can be completely cleaned.

If the water content is too less as less than 1%, the removing property of soiled matter on the inside surface of the mold is greatly decreased and it becomes difficult to completely remove the soiled matter of the mold. On the other hand, if the water content is more than 30%, the cleaning effect is saturated and the trouble for compounding water with the unvulcanized rubber is increased, which are useless. Also, water is separated, thereby it becomes difficult to obtain the form as a cleaning sheet.

Where the mold cleaning composition of the present invention is used to clean a mold for molding a semiconductor device using an epoxy resin composition comprising a biphenyl epoxy resin, a polyfunctional epoxy resin or a cyclopentadiene epoxy resin, the water content is preferably 5 to 20% by weight.

In using the mold cleaning composition of the present invention, it is generally preferred to use by forming the mold cleaning composition as a sheet form. Where the mold cleaning composition is used as a sheet form, from the view point of the ease of the cleaning work of a mold using it, etc., a sheet comprising the mold cleaning composition itself having formed on one surface thereof a plurality of straight cuts 11 in parallel at a definite interval, which can fold the sheet 10 along the cut, as shown in FIG. 1, is preferably used. The sheet having formed thereon a stripe-pattern is preferred. The sheet can be regularly heaped up by folding the sheet 10 utilizing the cut 11.

Figure 2:
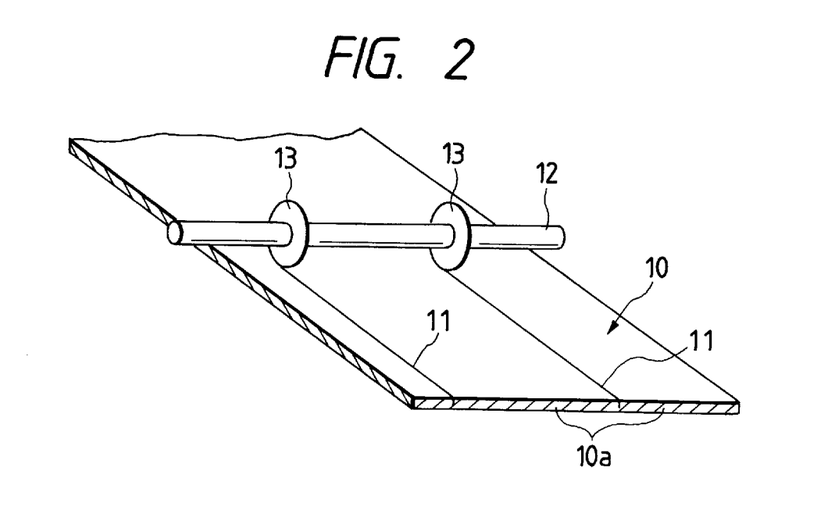
FIG. 2 is a slant view showing a state of forming cuts on the surface of the sheet-form cleaning composition.

The sheet 10 having formed thereon such cuts 11 is prepared by the following manner. After forming the sheet 10 by cutting the rolled sheet obtained into the definite form and size, cuts 11 are formed on the surface of the sheet. The formation of such cuts 11 is carried out as follows. For example, a ribbon slitter composed of a rotary shaft 12 equipped with disk-form cutting edges 13 at a definite interval as shown in FIG. 2 is used and the ribbon slitter is moved on the surface of the sheet while cutting the cutting edges 13 in the sheet 10 to a definite depth each from the upper surface of the sheet 10 to form parallel cuts 11 in the width direction of the sheet 10. By repeating the operation, parallel cuts 11 at a definite interval are formed on the entire surface of the sheet 10. The sheet 10 is partitioned by each cut 11 into each block piece 10a having the same size. Since the cuts 11 are formed at a definite interval, the cuts 11 have a function of a measure in folding the sheet 10, etc., and the sheet 10 can be easily cut or folded as fitting to the size of the mold and the cavity to be cleaned.

Figure 3:
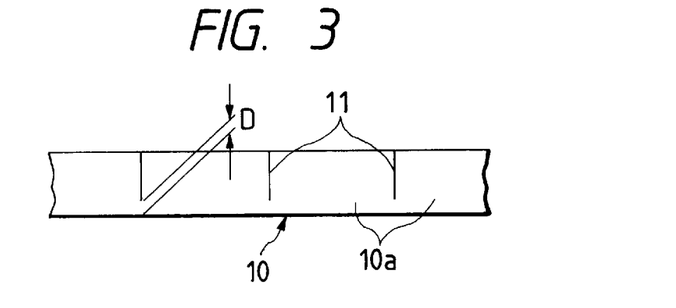
FIG. 3 is an enlarged side view showing cut portions.

As shown in FIG. 3, a distance D between the lower end portion of the cut 11 and the back surface of the sheet 10 facing the lower end portion is preferably from about 0.1 to 0.8 mm, and more preferably from about 0.2 to 0.5 mm. If the distance is less than 0.1 mm, the blocks 10a tend to be separated from each other, while if the distance is over 0.8 mm, the sheet is hard to be smoothly folded.

It is preferred that the sheet 10 is white or a light color such as gray. By using the sheet 10 having such a color, there are effects that after cleaning, soiled matters removed from the inside surface of the mold and attaching to the sheet 10 can be easily confirmed visually and the state of cleaning can be easily confirmed.

Other embodiment of the mold cleaning composition of the present invention is explained.

Figure 4:
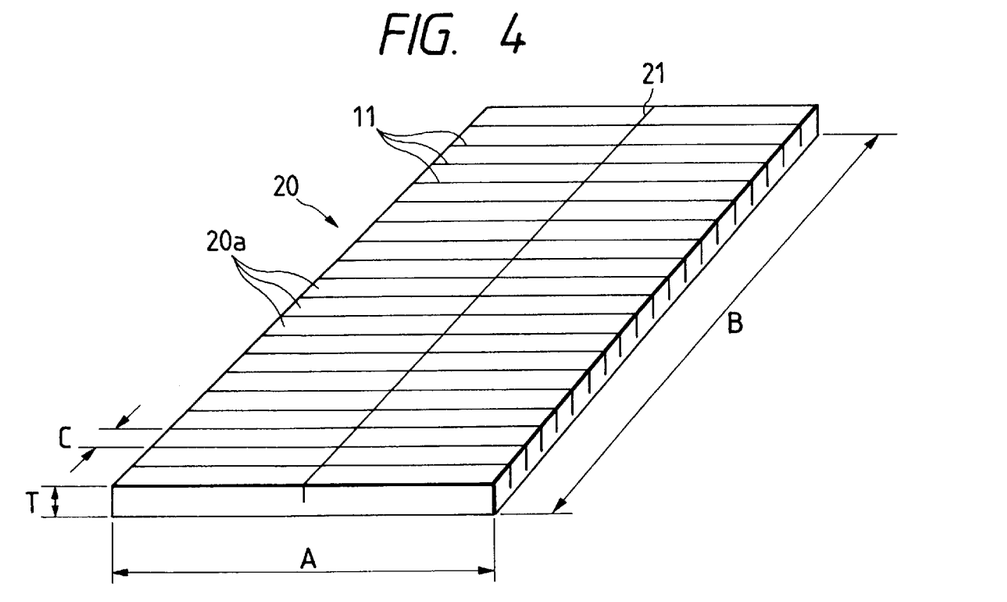
FIG. 4 is a slant view showing a sheet-form cleaning composition which is other embodiment of the present invention.

As shown in FIG. 4, a plurality of straight cuts 11 [cuts (A)] enabling folding of a sheet 20 comprising the mold cleaning composition are formed in parallel on the surface of the sheet 20 and also one straight cutting cut 21 [cutting cut (B)] is formed thereon such that the cutting cut crosses perpendicularly to the straight cuts 11 for dividing the width length A of the sheet 20 into two portions.

Figure 5:
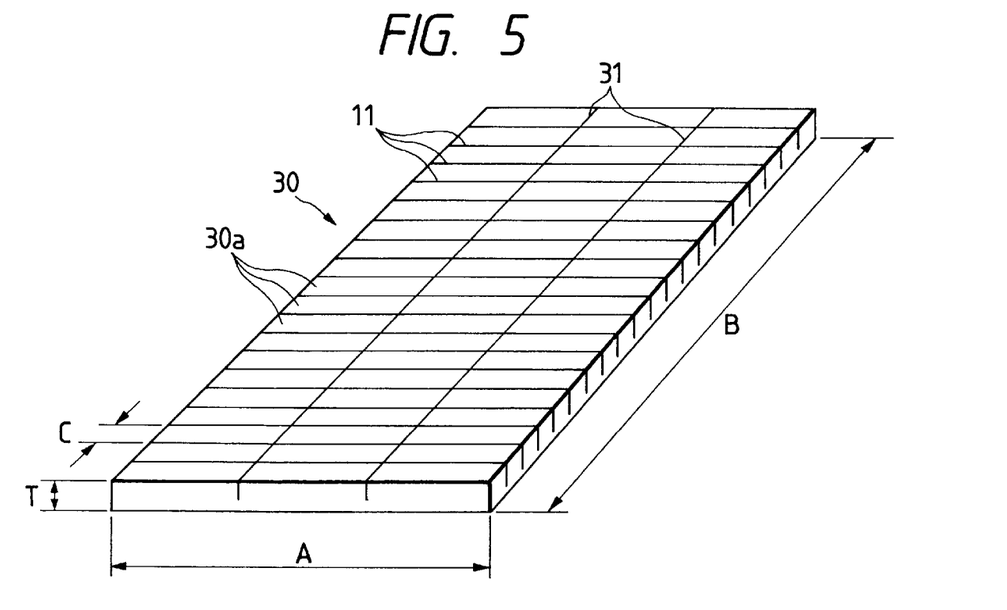
FIG. 5 is a slant view showing a sheet-form cleaning composition which is still other embodiment of the present invention.

In the sheet 20 of the above-described embodiment of the present invention, one straight cutting cut (B) is formed such that the cutting cut (B) crosses perpendicularly to the straight cuts 21. However, the cutting cut (B) is not limited to the embodiment and the desired number of straight cutting cuts (B) may be formed according to the size of the molding mold to be cleaned. For example, as shown in FIG. 5, a plurality of straight cuts 11 [cuts (A)] enabling folding of a sheet 30 are formed on the surface of the sheet 30 comprising the mold cleaning composition in parallel at a definite interval and also two straight cutting cuts 31 [cutting cuts (B)] are formed in parallel at a definite interval in the width direction of the sheet 30 such that the cutting cuts (B) cross perpendicularly to the straight cuts 11.

The number of the straight cutting cuts (B) formed on the sheet crossing perpendicularly to a plurality of straight cuts (A) formed on the surface of the sheet in parallel at a definite interval enabling folding of the sheet is properly determined. However, if the number of the cutting cuts (B) is too much, an inconvenience occurs in folding or cutting by the cuts (A). Hence it is preferred that the number of the cutting cuts (B) is 20% or lower of the number of the cuts (A).

The sheet having formed thereon the cuts (A) and the cutting cut(s) (B) crossing perpendicularly to the cuts (A) is prepared in the following manner.

After forming a sheet by cutting the rolled sheet into definite form and size, the cuts are formed on the surface of the sheet. Using, for example, a ribbon slitter (see FIG. 2), etc., parallel cuts are formed in the width direction of the sheet by the same method as described above. By repeating the operation, a plurality of parallel cuts (A) are formed at a definite interval on the entire surface of the sheet. Using the ribbon slitter, etc., the cutting cut(s) (B) are formed such that the cutting cut(s) (B) cross perpendicularly to the cuts (A). Alternatively, after forming the cutting cut(s) (B), the cuts (A) may be formed.

The sheet of the mold cleaning composition thus obtained is placed in a sealing bag prepared using a water impermeable film such as a plastic film, a metal-made film, etc., and stored in a closed state while maintaining the water content in the mold cleaning composition to the above-described definite range (i.e., from 1 to 30% by weight based on the weight of the mold cleaning composition).

Cleaning a mold using the mold cleaning composition of the present invention formed into the sheet form is carried out by placing the sheet in a mold for molding a semiconductor device. For example, the sheet is, as a matter of course, in an unvulcanized state and by placing the sheet in the molding mold and vulcanizing the sheet by heating, the soiled matter in the inside surface of the mold is attached to the sheet and integrated with the sheet in a body. By taking out the vulcanized sheet from the mold, cleaning of the mold is performed.

The cleaning method of the mold using the sheet-form mold cleaner composition is explained in more detail in order.

The sheet-form mold cleaning composition of the present invention is prepared. The sheet-form mold cleaning composition has a plurality of straight cuts 11 enabling folding the sheet 10 at a definite interval, formed on the surface thereof.

Figure 6:
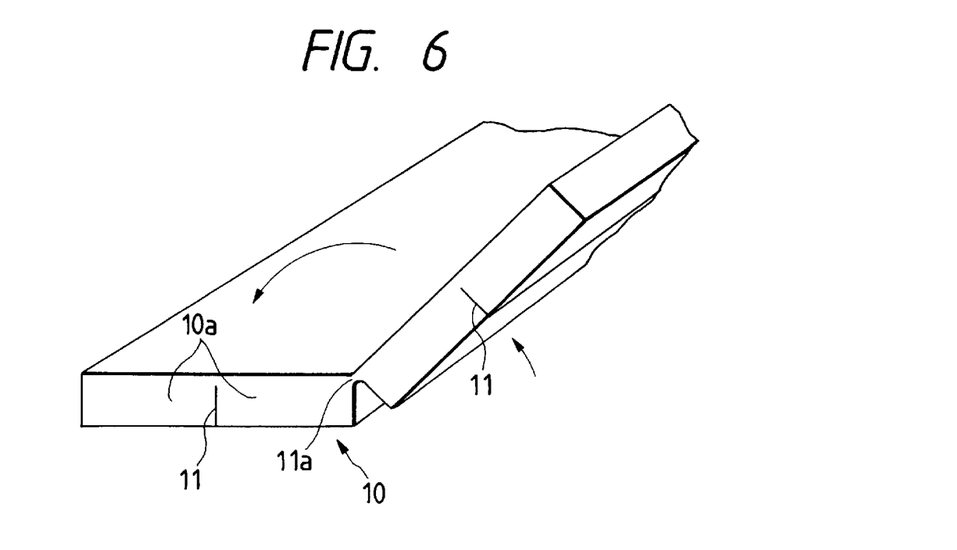
FIG. 6 is a slant view showing an action of the sheet-form cleaning composition.
Figure 7:
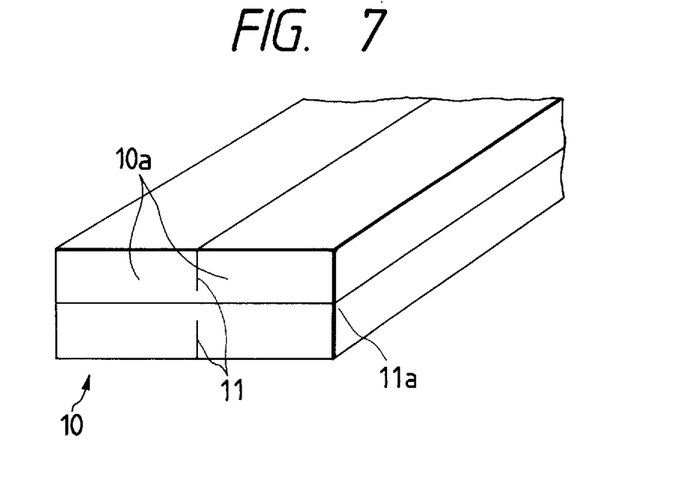
FIG. 7 is a slant view showing an action of the sheet-form cleaning composition.

Necessary number of block pieces 10a are cut off from the sheet 10 by cutting from the portions of the cuts 11. The cutting may be made by grasping the sheet 10 by hands, repeatedly bending along the cut 11 and breaking off the block piece or may be made by cutting with a knife, etc. As shown in FIG. 6 (in FIG. 6, 4 block pieces 10a are cut off), the sheet 10 is bent along the cut 11 with the upper surface (cuts 11—formed surface) outside and the sheet 10 is folded until the back surface of the sheet is brought into contact with each other to heap up the block piece 10a as shown in FIG. 7. In folding, because the block pieces 10a are connected in a line at the bottom portion 11a, they are not separated.

As described above, by only a simple action of folding, each black piece 10a is regularly heaped up in the accurately arranged state in the length direction and the width direction and the block pieces 10 are not heaped up in a crossed state with each other. Accordingly, troubles of measuring the size of the sheet 10 and cutting it in the same size, and arranging the black pieces 10a separated in disorder are unnecessary.

In FIG. 7, 4 block pieces are cut off, and the block pieces are folded along the center line (cut 11) to form the state that 2 block pieces 10a are heaped up on 2 block pieces 10a. However, the embodiment of the present invention is not limited to this embodiment. For example, 6 block pieces 10a are used by heaped up 3 block pieces 10a on 3 block pieces (not shown), etc., and desired number of block pieces can be cut off followed by folding to heaped up in a proper size fitting to the size of the mold or the cavity to be cleaned.

Figure 8:
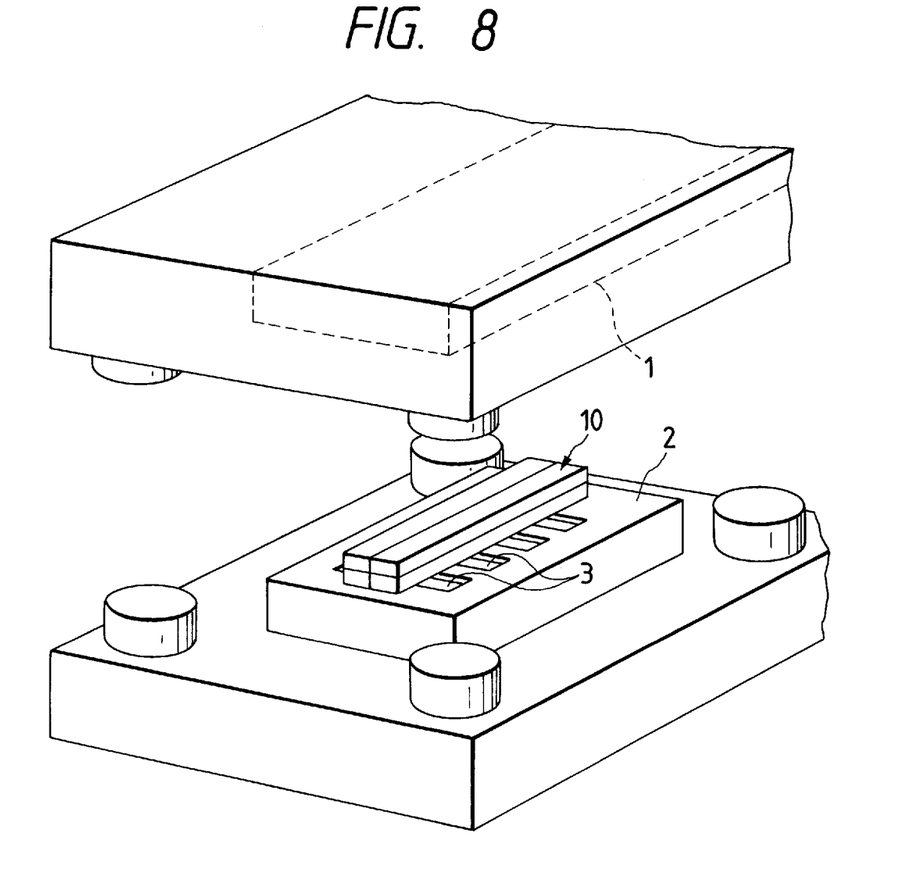
FIG. 8 is a slant view showing an action of the sheet-form cleaning composition.
Figure 9:
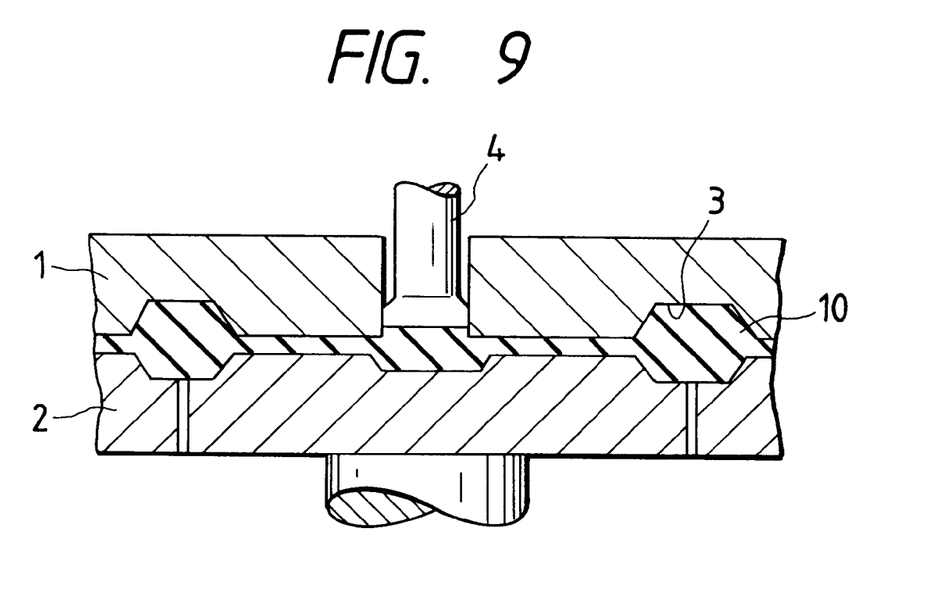
FIG. 9 is a slant view showing an action of the sheet-form cleaning composition.

As shown in FIG. 8, the sheet 10 in a heaped up state is disposed on the mold surface of a bottom force 2 and in the state, as shown in FIG. 9, a top force 1 and the bottom force 2 are closed to hold the sheet 10 between them and molded by pressing. By the pressure at molding, the sheet 10 is filled in the cavities 3 and press-contacted with the inside surfaces of the mold. In the state, the unvulcanized rubber is heat-vulcanized by the heat at molding to form a vulcanized rubber. In this case, the oxidized and deteriorated layer, etc., of the releasing agent formed in the cavities is integrated with the vulcanized rubber in a body. In this case, as the case may be, burrs around the cavities are also integrated with the vulcanized rubber in a body. After a definite time, the mold is opened and by releasing the sheet 10 composed of the vulcanized rubber 10 from the mold, the oxidized and deteriorated layer, etc., integrated with the sheet 10 are released from the inside surface of the mold. In this case, because each block piece is regularly heaped up, poor cleaning caused by insufficient filling of the sheet 10 in the cavities does not occur.

In the cleaning method of a mold using the sheet-form mold cleaning composition of the present invention, a cleaning method using the sheet having formed thereon a plurality of straight cuts (A) enabling folding the sheet in parallel at a definite interval and also having formed thereon at least one straight cutting cut (B) crossing perpendicularly to the straight cuts (A) is explained.

The sheet-form mold cleaning composition having formed thereon a plurality of straight cuts (A) in parallel at a definite interval and at least one straight cutting cut (B) crossing perpendicularly to the straight cuts (A) is prepared. The sheet is cut off at the portion(s) of the cutting cut(s) (B). The cutting may be made by grasping the sheet by hands, repeatedly bending along the cutting cut (B) and breaking off the block piece or may be made by cutting with a knife, etc. In the same manners as described above, the sheet is bent along the cut with the upper surface [cuts (A)-formed surface] outside and the sheet thus cut is bent and folded until the back surface of the sheet is brought into contact with each other to heap up the block piece. In the same manner as described above, by using the thus heaped up block pieces for the molding mold, cleaning the surfaces of the mold is performed.

It is considered that cleaning a mold using the mold cleaning composition of the present invention is made by the following mechanism.

Because at the vulcanization by heating, the inside of the mold is in a high-temperature and closed state, water contained in the unvulcanized rubber is evaporated and water permeates into the soiled material layer by the pressure of the steam to swell the soiled material attached to the inside surfaces of the mold, whereby the soiled material can be easily released from the surfaces of the mold and removed. The soiled material released from the surfaces of the mold is attached to the vulcanized sheet and integrated with the sheet in a body, and by taking out the sheet from the mold, the soiled material on the surfaces of the mold is removed and the mold is cleaned.

The mold which is cleaned with the mold cleaning composition of the present invention is a mold for molding a semiconductor device, which repeatedly carries out molding of semiconductor devices using a thermosetting resin composition.

In the mold for molding a semiconductor device, which is cleaned with the mold cleaning composition of the present invention, the thermosetting resin composition which is used as an encapsulating resin material includes, for example, an epoxy resin composition comprising an epoxy resin.

There is no particular limitation on the above-described epoxy resin and various kinds of epoxy resins are used. Novolak epoxy resins which are hitherto used and also biphenyl epoxy resins, polyfunctional epoxy resins, dicyclopentadiene epoxy resins, etc., which are recently used frequently because cured products thereof have good package characteristics, are used as the epoxy resin.

The epoxy resin composition is usually compounded with a curing agent. The curing agent is, for example, phenolaralkyl resins having a repeating unit represented by following formula (1), which are recently used frequently because the cured product thereof has good package characteristics similar to the above-described epoxy resin. It is preferred that the phenolaralkyl resin is used as a curing agent for the above-described phenyl epoxy resin.

In the mold cleaned with the mold cleaning composition of the present invention, the soiled product is removed and the surfaces of the mold return to the surfaces of the mold in the initial state. Therefore, in carrying out molding a semiconductor package using a thermosetting resin composition which is a molding material, a releasing agent must usually be previously coated on the surfaces of the mold. For example, in molding a molding material containing a polyethylene wax as a mold releasing agent, it is preferred to coat the surfaces of the mold with the same polyethylene wax. As a method of coating the polyethylene wax onto the surfaces of the mold, it is preferred to prepare an unvulcanized rubber composition containing the polyethylene wax and using a sheet formed with the unvulcanized rubber composition. For example, there is a sheet formed from the unvulcanized rubber which is the component (A) compounded with the releasing agent. The sheet having formed thereon cuts as described above is more preferably used as such a sheet. By placing the sheet comprising the unvulcanized rubber composition containing the polyethylene wax in the mold as the cleaning step using the sheet-form mold cleaning composition of the present invention followed by heating, the polyethylene wax contained in the sheet is coated on the surfaces of the mold. This is considered that the polyethylene wax in the unvulcanized rubber composition is melted at vulcanizing by heating and oozes onto the surfaces of the mold to form a uniform film of the releasing agent on the surfaces of the mold.

The content of the polyethylene wax is preferably from 15 to 35 pars, and more preferably from 20 to 30 parts, per 100 parts of the rubber material in the unvulcanized rubber composition. If the content of the polyethylene is less than 15 parts, a sufficient mold releasing effect is not obtained, while if the content is more than 35 parts, the polyethylene wax is excessively coated on the surfaces of the mold and when a molded product is molded using the mold after cleaning and regenerating, there is a tendency that the appearance of the molded product deteriorates.

The present invention is explained by the following examples and comparative examples, but the invention is not limited to these examples.

EXAMPLES 1 TO 11 AND COMPARATIVE EXAMPLES 1 TO 3

The components each shown in Table 1 and Table 2 below were compounded at the ratios shown in the Tables, and the compounded mixture was kneaded by a kneading roll. The kneaded mixture was formed to a sheet having a thickness of 5 mm using a rolling roll to obtain each sheet-form mold cleaning composition. Water contents in the mold cleaning compositions obtained are also shown in Table 1 and Table 2.

Conventional Example

A thermosetting melamine resin was used as the mold cleaning material.

TABLE 1

| | Example | | | | | | | |
|---|---|---|---|---|---|---|---|---|
| | 1 | 2 | 3 | 4 | 5 | 6 | 7 | 8 |
| Components: (parts by weight) | | | | | | | | |
| BR | 70 | 50 | 50 | 50 | 50 | 50 | 50 | 50 |
| EPR*1 | 30 | 50 | 50 | 50 | 50 | 50 | 50 | 50 |
| Stearic acid | 1 | 1 | 1 | 1 | 1 | 1 | 1 | 1 |
| Silica powder | 30 | 30 | 30 | 30 | 30 | 30 | 30 | 30 |
| Ti oxide | 5 | 5 | 5 | 5 | 5 | 5 | 5 | 5 |
| Carnauba wax | 20 | 20 | 20 | 20 | 20 | 20 | 20 | 20 |
| Imidazole*2 | 10 | 10 | — | 5 | 10 | 10 | 20 | 10 |
| Imidazoline*3 | — | — | 10 | 5 | — | — | — | — |
| OPO*4 | 3 | 3 | 3 | 3 | 3 | 3 | 3 | 3 |
| Water | 30 | 30 | 30 | 30 | 20 | 10 | 30 | 2 |
| Water content (%) | 15 | 15 | 15 | 15 | 10.5 | 5.5 | 14.3 | 1 |

Notes:
*1 The copolymerization ratio (p)/(q) of ethylene (p) to propylene (q) is 55/45 by molar ratio.
*2 2,4-Diamino-6-[2'-methylimidazolyl-(1') ]ethyl-s-triazine
*3 2-Phenylimidazoline
*4 n-Butyl-4,4-bis(t-butylperoxy) valerate

TABLE 2

| | Example | | | Comparative Example | | | Conventional Example |
|---|---|---|---|---|---|---|---|
| | 9 | 10 | 11 | 1 | 2 | 3 | |
| Components: (parts by weight) | | | | | | | |
| BR | 50 | 50 | 50 | 50 | 50 | 50 | — |
| EPR*1 | 50 | 50 | 50 | 50 | 50 | 50 | — |
| Stearic acid | 1 | 1 | 1 | 1 | 1 | 1 | — |
| Silica powder | 30 | 30 | 30 | 30 | 30 | 30 | — |
| Ti oxide | 5 | 5 | 5 | 5 | 5 | 5 | — |
| Carnauba wax | 20 | 20 | 20 | 20 | 20 | 20 | — |
| Imidazole*2 | 10 | 10 | 10 | 10 | 10 | 10 | — |
| Imidazoline*3 | — | — | — | — | — | — | — |
| OPO*4 | 3 | 3 | 3 | 3 | 3 | 3 | — |
| Water | 72 | 6 | 56 | — | 1 | 90 | — |
| Melamine resin | — | — | — | — | — | — | 100 |
| Water content (%) | 29.8 | 3.4 | 24.9 | 0 | 0.6 | 34.7 | — |

*1 to *4 Same as shown in Table 1.

Each of the sheet-form mold cleaning compositions obtained in the examples, the comparative examples, and the conventional example was placed in a molding mold (after 1,000 shots) the surfaces of which were spoiled by repeated molding of a molding epoxy resin composition comprising the following compounding composition. After vulcanizing by heating at 175° C. for 5 minutes, the sheet was taken out from the mold, and the removing property of the soiled material was visually confirmed and evaluated. Also, the thermosetting melamine resin (resin of the conventional example) was taken out from the mold after curing by heating at 175° C. for 3 minutes and the removing property of the soiled material was visually confirmed and evaluated.

In the evaluation, when the soiled material was completely removed, it is evaluated as "good", and when the removal is insufficient, it is evaluated as "poor".

The results obtained are shown in Table 3 below.

| [Molding Epoxy Resin Composition] (parts) | Amount |
|---|---|
| Biphenyl epoxy resin (epoxy equivalent 192) | 100 |
| Phenolaralkyl resin (hydroxy group equivalent 163) | 90 |
| Silica powder | 1,800 |
| Brominated epoxy resin | 15 |
| Antimony trioxide | 15 |
| Tetraphenyl phosphonium tetraphenyl borate (4P4B) | 4 |
| Ion trapping agent | 3 |
| Carbon | 4 |
| Silane coupling agent | 8 |
| Polyethylene wax | 5 |

TABLE 3

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Result* | G | G | G | G | G | G | G | G | G | G | G |

*Evaluation result of the cleaning property of the mold.
G: Good

TABLE 4

| | Comparative Example | | | Conventional Example |
|---|---|---|---|---|
| | 1 | 2 | 3 | |
| Evaluation Result*1 | P | P | —*2 | P |

*1 Evaluation result of the cleaning property of the mold.
*2 A sheet form could not be obtained.
P: Poor From the results shown in Table 3 and Table 4 above, each of the products obtained in Comparative Examples 1 and 2 and the Conventional Example was poor in the mold cleaning property and did not sufficiently remove the soiled material from the mold. On the other hand, in each of the products obtained the Examples of the present invention, it was confirmed that the soiled material formed on the surfaces of the mold was transferred and attached to the surface of the sheet-form mold cleaning composition taken out from the mold, whereby it was also confirmed that the surfaces of the mold were sufficiently cleaned.

Furthermore, for the molding mold repeatedly molding using an epoxy resin composition containing a polyfunctional epoxy resin in place of the biphenyl epoxy resin in the epoxy resin composition for molding, the removing property of the soiled material formed on the mold using each of the products obtained in the examples, the comparative examples and the conventional example was confirmed and evaluated in the same manner as described above. The results were as follows.

Each of the products obtained in the Comparative Examples and the Conventional Example was poor in the mold cleaning property and did not sufficiently remove the soiled material from the mold. On the other hand, in each of the products obtained in the Examples of the present invention, it was confirmed that the soiled material formed on the surfaces of the mold was transferred and attached to the surface of the sheet-form mold cleaning composition taken out from the mold, whereby it was also confirmed that the surfaces of the mold were sufficiently cleaned.

For the molding mold repeatedly molding using an epoxy resin composition containing a dicyclopentadiene epoxy resin in place of the biphenyl epoxy resin in the epoxy resin composition for molding, the removing property of the soiled material formed on the mold was confirmed and evaluated in the same manner as described above. The results were as follows.

Each of the products obtained in the Comparative Examples and the Conventional Example was poor in the mold cleaning property and did not sufficiently remove the soiled material from the mold. On the other hand, in each of the products obtained in the Examples of the present invention, it was confirmed that the soiled material formed on the surfaces of the mold was transferred and attached to the surface of the sheet-form mold cleaning composition taken out from the mold, whereby it was also confirmed that the surfaces of the mold were sufficiently cleaned.

Examples of using the sheet-form mold cleaning compositions having formed thereon cuts are explained.

EXAMPLE 12

As shown in FIG. 1, each of the sheet-form mold cleaning compositions [thickness (T in FIG. 1) 5 mm] obtained in Examples 1 to 11 above was cut into a width (A in FIG. 1) of 230 mm and a length (B in FIG. 1) of 300 mm. Cuts 11 having an interval (C in FIG. 1) between the cuts 11 of 15 mm and a depth of 4.5 mm were formed in parallel in the width direction on the entire surface of the sheet. Thus, the distance (D in FIG. 3) between the lower end portion of the cut 11 and the back surface of the sheet 10 facing the lower end portion of the cut 11 was 0.5 mm. In this embodiment, 20 block pieces 10a were formed.

Each of the sheet-form mold cleaning compositions having formed thereon the cuts 11 was cut for fitting each of several kinds of transfer molding machines each having a mold of a different size (each molding mold after 1000 shots repeatedly molded as described above using the above-described epoxy resin composition for molding), folded at the cut 11 portion followed by heaping up. After holding each sheet thus heaped up in the mold, cleaning was performed. The results showed that the cleaning property of the mold was very good and poor cleaning did not occur in each case of using the product obtained in each example.

Example of using the sheet-form mold cleaning composition having formed thereon a plurality of straight cuts (A) in parallel in a definite direction at a definite interval and also having formed thereon at least one straight cutting cut (B) crossing perpendicularly to the straight cuts (A) is explained.

EXAMPLE 13

As shown in FIG. 4, each of the sheet-form mold cleaning compositions [thickness (T in FIG. 4) 5 mm] obtained in Examples 1 to 11 above was cut into a width (A in FIG. 4) of 230 mm and a length (B in FIG. 4) of 300 mm. Cuts 11 having an interval (C in FIG. 4) between the cuts 11 of 15 mm and a depth of 4.5 mm were formed in parallel in the width direction on the entire surface of the sheet. A distance (D in FIG. 3) between the lower end portion of the cut 11 and the back surface of the sheet 20 facing the lower end portion of the cut 11 was 0.5 mm. In this embodiment, 20 block pieces 10a were formed.

One straight cutting cut 21 (depth 4.5 mm) was formed in the lengthwise direction of the sheet 20 such that the cutting cut 21 could split the width (A in FIG. 4) of the sheet 20 into two portion and also crossed perpendicularly to the cuts 11.

Each sheet-form mold cleaning composition having formed thereon two kinds of cuts 11 and 21 was cut by the cutting cut 21 into a proper size fitting each of several kinds of transfer molding machines each having a mold of a different size (each molding mold after 1000 shots repeatedly molded as described above using the above-described epoxy resin composition for molding), folded at the cut 11 portion followed by heaping up. After holding each sheet thus heaped up in the mold, cleaning was performed. The results showed that the cleaning property of the mold was very good, and poor cleaning did not occur in each case of using the product obtained in each example.

EXAMPLE 14

As shown in FIG. 5, each of the sheet-form mold cleaning compositions [thickness (T in FIG. 5) 5 mm] obtained in Examples 1 to 11 above was cut into a width (A in FIG. 5) of 230 mm and a length (B in FIG. 5) of 300 mm. Cuts 11 having an interval (C in FIG. 5) between the cuts 11 of 15 mm and a depth of 4.5 mm were formed in parallel in the width direction on the entire surface of the sheet. A distance (D in FIG. 3) between the lower end portion of the cut 11 and the back surface of the sheet 30 facing the lower end portion of the cut 11 was 0.5 mm. In this embodiment, 20 block pieces 10a were formed.

Two straight cutting cuts 31 (depth 4.5 mm) were formed in the lengthwise direction of the sheet 30 such that the cutting cuts 31 could split the width (A in FIG. 5) of the sheet 30 into three portions and also crossed perpendicularly to the cuts 11.

Each sheet-form mold cleaning composition having formed thereon two kinds of cuts 11 and 31 was cut by the cutting cut 31 into a proper size fitting each of several kinds of transfer molding machines each having a mold of a different size (each molding mold after 1000 shots repeatedly molded as described above using the above-described epoxy resin composition for molding), folded at the cut 11 portion followed by heaping up. After holding each sheet thus heaped up in the mold, cleaning was performed. The results showed that the cleaning property of the mold was very good, and poor cleaning did not occur in each case of using the product obtained in each example.

As described above, the cleaning composition for a mold for molding a semiconductor device of the present invention contains the unvulcanized rubber (component A) which becomes the base, and the cleaning agent (component B) together with a specific amount of water. Thus, when cleaning of the surfaces of the mold for molding semiconductor devices is performed using the cleaning composition of the present invention, the soiled material formed on the surfaces of the mold is attached to the mold cleaning composition, and integrated with the mold cleaning composition in a body, and the soiled material is effectively removed from the mold. In particular,. the soiled material on the inside surfaces of a mold formed by repeatedly molding using an epoxy resin composition comprising a biphenyl epoxy resin, a polyfunctional epoxy resin, or a dicyclopentadiene epoxy resin, the sufficient cleaning of the mold having been difficult with conventional cleaning compositions, is integrated with the molded product of the mold cleaning composition of the present invention, whereby the soiled material is effectively removed from the mold and cleaning the mold is effectively performed. Accordingly, the mold cleaning composition of the present invention has excellent appearance.

Also, when the mold cleaning composition of the present invention is formed into a sheet form and a plurality of straight cuts are formed on the surface of the sheet in a definite direction, when using the sheet the sheet can be easily heaped up by folding the sheet along the cut. In this case, because the block pieces partitioned by the parallel cut are connected to each other at the bottom portion of the cut, the sheet is regularly heaped up by folding without being slipped out and also the block pieces are not heaped up in a crossed state. Thus, the heaped up article obtained does not become a distorted form. By cleaning the inside surface of the mold with the sheet-form cleaning composition thus regularly heaped up, poor cleaning occurring by the insufficient press-contact of the unvulcanized rubber with the surface of the mold does not occur. Also, complicated works of expressly measuring the side of the sheet and cutting it in the same size become unnecessary and the cleaning work is simplified.

Also, in the mold cleaning composition of the present invention, particularly the sheet comprising the mold cleaning composition having formed thereon a plurality of straight cuts (A) in a definite direction and also having formed at least one straight cutting cut (B) crossing perpendicularly to the straight cuts (A), when using the same, after properly cutting the sheet along the cutting cut (B) and then folding the sheet thus cut along the cut (A), the sheet can be easily heaped up such that the heaped up sheet becomes a proper form and size for the size of the molding mold to be cleaned. In this case, because the block pieces partitioned by the parallel cut are also connected to each other at the bottom portion of the cut, the sheet is regularly heaped up by folding without being slipped out and also the block pieces are not heaped up in a crossed state. Thus, the heaped up article obtained does not become a distorted form. By cleaning the inside surface of the mold with the sheet-form cleaning composition thus regularly heaped up, poor cleaning occurring by the insufficient press-contact of the unvulcanized rubber with the surface of the mold does not occur. Also, by forming the cutting cut(s) (B), the sheet can be easily cut fitting a smaller size of the mold without causing irregularity.

Moreover, in the sheet-form mold cleaning composition of the present invention, when cuts are formed on the surface of the sheet at a definite interval, the cuts show the function as a measure, and even for a mold having different type and size, a proper amount of the sheet can be easily cut and heaped up to perform cleaning of the mold. For example, a transfer molding machine is suitable as the molding mold to be cleaned using such a mold cleaner composition.

Further, the mold cleaning composition of the present invention is placed in a sealing bag prepared by a water impermeable film and is stored in a closed state, whereby the specific water content (from 1 to 30%) can be maintained.

While the invention has been described in detail and with reference to specific embodiments thereof, it will be apparent to one skilled in the art that various changes and modifications can be made therein without departing from the spirit and scope thereof.

What is claimed is:

1. A cleaning composition for cleaning a mold used for repeatedly molding semiconductor devices using a thermosetting resin composition, said cleaning composition comprising components (A) and (B):

(A) an unvulcanized rubber, and
   (B) a cleaning agent,
   wherein the cleaning composition is placed in a sealing bag prepared from a water impermeable film and said sealing bag is maintained in a closed state such that the water content in the cleaning composition is from 1 to 30% by weight based on the total weight of the cleaning composition.

* * * * *